United States Patent
Kakuishi et al.

[11] Patent Number: 5,904,979
[45] Date of Patent: *May 18, 1999

[54] MAGNETIC RECORDING SYSTEM

[75] Inventors: Yutaka Kakuishi; Kenichi Masuyama; Kiyomi Ejiri, all of Kanagawa, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,567

[22] Filed: Feb. 14, 1996

[30] Foreign Application Priority Data

Feb. 21, 1995 [JP] Japan ................................. 7-055174

[51] Int. Cl.⁶ .................................................. G11B 05/712
[52] U.S. Cl. ........................... 428/328; 428/336; 428/403; 428/522; 428/694 BS; 428/694 BA; 428/900
[58] Field of Search ................................... 360/88, 97.01, 360/113; 428/328, 336, 403, 522, 694 BS, 694 BA, 900

[56] References Cited

U.S. PATENT DOCUMENTS

| | | | |
|---|---|---|---|
| 3,630,790 | 12/1971 | Schmidt | 148/6.15 R |
| 4,550,054 | 10/1985 | Yamauchi et al. | 428/328 |
| 4,584,243 | 4/1986 | Kadokura et al. | 428/403 |
| 4,789,591 | 12/1988 | Nakamura et al. | 428/328 |
| 4,853,815 | 8/1989 | Diepers | 360/126 |
| 5,082,733 | 1/1992 | Watanabe et al. | 428/403 |
| 5,176,955 | 1/1993 | Ejiri et al. | 428/336 |
| 5,244,736 | 9/1993 | Hashimoto et al. | 428/403 |
| 5,390,061 | 2/1995 | Nakatani et al. | 360/113 |

FOREIGN PATENT DOCUMENTS

0566100 10/1993 European Pat. Off. .

*Primary Examiner*—Stevan A. Resan
*Attorney, Agent, or Firm*—Sughrue, Mion, Zinn, Macpeak & Seas, PLLC

[57] ABSTRACT

(1) A magnetic recording system is disclosed, which comprises a thin-film magnetic head and a magnetic recording medium comprising a nonmagnetic support having thereon a magnetic layer comprising mainly ferromagnetic particles and a binder resin, wherein said binder resin comprising mainly a vinyl chloride resin, and said ferromagnetic particles are surface-treated with at least an organic compound. (2) Another magnetic recording system is disclosed, which comprises a thin-film magnetic head and a magnetic recording medium comprising a nonmagnetic support, a nonmagnetic layer comprising mainly inorganic nonmagnetic particles and a binder resin over the nonmagnetic support, and a magnetic layer comprising mainly ferromagnetic metal particles and a binder resin over the nonmagnetic layer, wherein said binder resins in said magnetic and nonmagnetic layers each comprises mainly a vinyl chloride resin, said ferromagnetic metal particles are surface-treated with at least an organic compound, and said magnetic layer has a thickness of from 0.05 to 1.0 $\mu$m.

18 Claims, No Drawings

MAGNETIC RECORDING SYSTEM

FIELD OF THE INVENTION

The present invention relates to a magnetic recording system comprising a magnetic recording medium and a thin-film magnetic head.

BACKGROUND OF THE INVENTION

In magnetic recording systems for data storage, a thin-film magnetic head has been put to practical use in order to realize a high transfer rate and a high recording density. Use of such a thin-film magnetic head as a multitrack fixed head is suitable for the attainment of a higher transfer rate especially in recording systems employing a magnetic tape as the recording medium. This is because thin-film magnetic heads can be easily fabricated into multitrack heads. A desirable reproducing head is a high-output magneto-resistive head (MR head).

On the other hand, magnetic metal particles superior to magnetic iron oxide and $CrO_2$ in electromagnetic characteristics are suitable for use as the magnetic particles of a magnetic recording medium. The binder resin used for dispersing magnetic particles therein is desirably a vinyl chloride resin from the standpoints of dispersing ability and storage stability.

However, there is a problem that vinyl chloride resins generate hydrogen chloride, which corrodes thin-film magnetic heads. This problem has been an obstacle to the use of vinyl chloride resins. Even the vinyl chloride resins designed not to generate hydrogen chloride, e.g., "MR-110", manufactured by Nippon Zeon Co., Ltd., Japan and containing epoxy groups within the molecule, have been insufficient.

In JP-B-6-42283 (the term "JP-B" as used herein means an "examined Japanese patent publication") is disclosed a combination of a magnetic recording medium containing a binder consisting mainly of not a vinyl chloride resin but a polyurethane and a thin-film MR head ("Drive F613A", manufactured by Fujitsu Ltd., Japan). However, since the polyurethane is inferior in dispersing ability to vinyl chloride resins, the magnetic layer has a rough surface undesirable in high-recording-density media. Another drawback is that the polyurethane hydrolyzes with the lapse of time to cause head fouling, namely, the conventional magnetic recording medium has insufficient storage stability.

It was thus found that the polyurethane is also unsuitable for use as the binder resin of a magnetic recording medium to be used in combination with a thin-film magnetic head for realizing a high transfer rate and a high recording density. A technique for preventing head fouling and corrosion has been strongly demanded in such a magnetic recording system employing a combination of a thin-film magnetic head and a magnetic recording medium.

SUMMARY OF THE INVENTION

An object of the present invention is to provide a magnetic recording system which not only realizes a high transfer rate and a high recording density with use of a thin-film magnetic head, but shows satisfactory long-term storage stability The above object of the present invention is accomplished with (1) a magnetic recording system which comprises a thin-film magnetic head and a magnetic recording medium comprising a nonmagnetic support having thereon a magnetic layer comprising mainly ferromagnetic particles and a binder resin, wherein said binder resin comprises mainly a vinyl chloride resin, and said ferromagnetic particles are surface-treated with at least an organic compound; and (2) a magnetic recording system which comprises a thin-film magnetic head and a magnetic recording medium comprising a nonmagnetic support, a nonmagnetic layer comprising mainly inorganic nonmagnetic particles and a binder resin over the nonmagnetic support, and a magnetic layer comprising mainly ferromagnetic metal particles and a binder resin over the nonmagnetic layer, wherein said binder resins in said magnetic and nonmagnetic layers each comprising mainly of a vinyl chloride resin, said ferromagnetic metal particles are surface-treated with at least an organic compound, and said magnetic layer has a thickness of from 0.05 to 1.0 $\mu$m.

DETAILED DESCRIPTION OF THE INVENTION

According to the present invention, it has been found that a magnetic recording system in which magnetic recording due to a magnetic recording medium with a thin-film magnetic head can be conducted at a high transfer rate and a high recording density and which shows satisfactory long-term storage stability, can be provided by using, as the ferromagnetic particles contained in the magnetic layer of the magnetic recording medium, ferromagnetic particles whose surface has been treated with at least an organic compound and by selecting a vinyl chloride resin as a binder resin in the magnetic layer, and by forming the magnetic layer having a thickness of from 0.05 to 1.0 $\mu$m (preferably from 0.1 to 0.5 $\mu$m) on a nonmagnetic layer and using a vinyl chloride resin as a binder resin in the nonmagnetic layer.

The reason why the above-described effects are produced in the present invention may be as follows.

In general, vinyl chloride resins have a good wettability to ferromagnetic particles and a good dispersibility to the ferromagnetic particles. However, vinyl chloride resins have the drawback that they are apt to generate hydrogen chloride by the catalytic action of the ferromagnetic particles as described above.

In the present invention, the catalytic action is inhibited by treating and coating the surface of ferromagnetic particles with at least an organic compound. Thus, the vinyl chloride resin is inhibited from generating hydrogen chloride to thereby prevent the thin-film magnetic head from corroding and ensure long-term storage stability The elements used in the present invention are explained below.

The thin-film magnetic head for use in the present invention is preferably one which enables a higher recording/reproducing efficiency and a higher density recording than bulk heads and which can be easily fabricated into a multitrack head and can attain a high transfer rate.

A thin-film magnetic head is produced by depositing a magnetic thin film serving as a magnetic core as an element of the magnetic head, a conductor layer serving as a winding wire as another element, and an insulator layer as still another element on a flat substrate by means such as vapor deposition or sputtering and forming the resulting structure into a desired shape by a photoresist technique. Thin-film magnetic heads therefore have an advantage that miniaturized elements with higher precision can be easily produced. Moreover, since the magnetic core is constituted of a magnetic thin film, not only a satisfactory core efficiency is obtainable up to high frequency, but also the magnetic head can be reduced in inductance and have a heightened self-resonance frequency. On the other hand, the thin-film magnetic heads are unsuitable for use as reproducing heads of the electromagnetic induction type utilizing Faraday's law, because the number of the magnetic head conductor winding wire is small due to the structure thereof and hence the output voltage thereof is low. Consequently, magnetoresistive (MR) heads utilizing a magnetoresistance effect have been put to practical use as reproducing heads.

Investigations on GMR heads utilizing a giant magnetoresistance effect which brings about an even higher reproduced output are being pursued recently.

Although thin-film magnetic heads usable in the present invention are not particularly limited, MR heads of the shield type or vertical type, in which the MR element slides on a magnetic recording medium, are especially effective.

The ferromagnetic particles to be used in the present invention are surface-treated with at least an organic compound (hereinafter this "at least an organic compound" is referred to also as "surface-treating agent"). This surface-treating agent is not particularly limited. It is preferred to use this surface-treating agent also for the treatment of the inorganic nonmagnetic particles to be incorporated in the optionally formed nonmagnetic layer.

The surface treatment with a surface-treating agent in the present invention means an act of chemically bonding through covalent bonds or physicochemically adsorbing the surface-treating agent to the surface of ferromagnetic particles or inorganic nonmagnetic particles. Methods for this surface treatment are not particularly limited. Examples thereof include a method in which the surface-treating agent is mixed with ferromagnetic particles or inorganic nonmagnetic particles to perform the surface treatment before a coating solution is prepared; and a method in which during the kneading of a binder resin together with ferromagnetic particles or inorganic nonmagnetic particles for preparing a coating solution, the surface-treating agent is added at an appropriate stage to perform the surface treatment.

Examples of the organic compound as the surface-treating agent include the following.
(1) Organic acids having a $pK_a$ of 3 or lower: These acids are tenaciously adsorbed onto ferromagnetic particles or inorganic nonmagnetic particles through bonds with OH groups on surface of the particles. Too high a $pK_a$ undesirably results in exchange adsorption with a coexisting fatty acid.

The amount of these organic acids to be adsorbed onto ferromagnetic particles is usually from 0.3 to 30 $\mu$mol, preferably from 1 to 10 $\mu$mol, per m$^2$ of the surface area of the particles as measured by the BET method. The amount of the organic acids to be adsorbed onto inorganic nonmagnetic particles is usually from 0.3 to 30 $\mu$mol, preferably from 1 to 10 $\mu$mol, per m$^2$ of the surface area of the particles as measured by the BET method.
(2) Low-molecular weight epoxy compounds: These epoxy compounds are tenaciously adsorbed onto ferromagnetic particles or inorganic nonmagnetic particles because the epoxy groups contained therein undergo ring opening to form chemical bonds with OH groups of the particles.

The amount of these epoxy compounds to be adsorbed onto ferromagnetic particles is usually from 0.3 to 30 $\mu$mol, preferably from 1 to 10 $\mu$mol, per m$^2$ of the surface area of the particles as measured by the BET method. The amount of the epoxy compounds to be adsorbed onto inorganic nonmagnetic particles is usually from 0.3 to 30 $\mu$mol, preferably from 1 to 10 $\mu$mol, per m$^2$ of the specific surface area of the particles as measured by the BET method.
(3) Silane coupling agents and titanate coupling agents: These coupling agents undergo a coupling reaction with ferromagnetic particles or inorganic nonmagnetic particles and are thus tenaciously adsorbed onto the particles through chemical bonds with OH groups on the surface of the particles.

The amount of the coupling agents to be adsorbed onto ferromagnetic particles is usually from 0.3 to 30 $\mu$mol, preferably from 1 to 10 $\mu$mol, per m$^2$ of the surface area of the particles as measured by the BET method. The amount of the coupling agents to be adsorbed onto inorganic nonmagnetic particles is usually from 0.3 to 30 $\mu$mol, preferably from 1 to 10 $\mu$mol, per m$^2$ of the surface area of the particles as measured by the BET method. In the case of using two or more of those coupling agents in combination, they may be adsorbed in such the amounts that the total amount thereof is almost within the range specified above.

In the present invention, at least two kinds of surface-treating agents selected from (1) to (3) above may be used in combination. In this case, the amount of each kind of surface-treating agent used may be suitably selected from the range specified above.

Specific examples of the above-described surface-treating agents (1) to (3) are enumerated below, but the surface-treating agent which can be used in the present invention should not be construed as being limited thereto.

Examples of the organic acids having a $pK_a$ of 3 or less include α-naphthylphosphoric acid, phenylphosphoric acid, diphenylphosphoric acid, p-ethylbenzenephosphonic acid, phenylphosphonic acid, phenylphosphinic acid, methanesulfonic acid, benzenesulfonic acid, p-toluenesulfonic acid, naphthalene-α-sulfonic acid, and naphthalene-β-sulfonic acid.

Examples of the epoxy compounds include those represented by the following formulae, wherein $R_1$, $R_2$, and $R_3$ each represents an aliphatic or aromatic group and X represents —SO$_3$M, —OSO$_3$M, —OPO(OM)$_2$, —PO(OM)$_2$, or —COOM (where M is a hydrogen atom or an alkali metal).

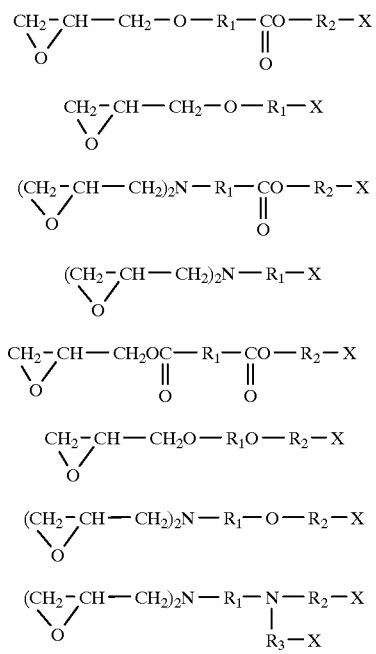

Examples of the silane coupling agents include vinylethoxysilane, vinyltris (β-methoxyethoxy)silane, γ-methacryloxypropyltrimethoxysilane, β-(3,4- epoxycyclohexyl)-ethylmethoxysilane, N-β(aminoethyl)-γ-aminopropyltrimethoxysilane, γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

Examples of the titanate coupling agents include isopropyl triisostearoyl titanate, isopropyl tri(N-aminoethylaminoethyl) titanate, tetraoctyl bis(ditridecyl phosphite) titanate, tetra(2,2-diallyloxymethyltributyl) bis(tridecyl) phosphite titanate, bis(dioctyl pyrophosphate) oxyanate titanate, bis(dioctyl pyrophosphate) ethylene titanate, isopropyl trioctanoyl titanate, isopropyl, dimethacryloyl isostearoyl titanate, isopropyl tridecyl benzenesulfonyl titanate, isopropyl stearoyl diacryloyl titanate, isopropyl tri(dioctyl phosphate) titanate, isopropyl triamyl titanate, and tetraisopropyl bis(dioctyl phosphite) titanate.

Examples of the surface-treating agent which can be used in the present invention further include the organophosphorus compounds described in JP-A-3-185621 (the term "JP-A" as used herein means an "unexamined published Japanese patent application") and JP-A-4-263116, the organic acids described in JP-A-3-160617, the organic silane compounds described in JP-A-3-73414, the coupling agents having an amine group described in JP-A-3-17821, and the organic silane compounds described in JP-A-2-297718.

Examples of the surface-treating agent other than organic compounds which can be used in the present invention include inorganic-compound surface-treating agents such as Al, Si, P, Ti, Zr, Sn, Sb, Zn, Y, and oxides thereof. These inorganic-compound surface-treating agents are usually used in surface treatment in the form of an aqueous solution of a salt, hydroxide, etc.

The amount of the inorganic compounds to be adsorbed onto ferromagnetic particles is usually from 0.1 to 10% by weight, preferably from 1 to 10% by weight, based on the amount of the particles. The amount of the inorganic compounds to be adsorbed onto inorganic nonmagnetic particles is usually from 0.05 to 10% by weight, preferably from 0.5 to 5% by weight, based on the amount of the particles.

In the present invention, the ferromagnetic particles and inorganic nonmagnetic particles which have undergone surface treatment with any of those inorganic compounds may be further subjected to surface treatment with the organic-compound surface-treating agent described above. Inorganic nonmagnetic particles thus treated are especially preferred in that the surface treatment with the inorganic compound and the subsequent surface treatment with the organic compound enhance the effect of inhibiting Permalloy corrosion.

Known ferromagnetic particles can be used in the magnetic layer in the present invention. Examples thereof include γ-FeO$_x$ (x=1.33–1.5), Co-modified γ-FeO$_x$ (x=1.33–1.5), fine particles of a ferromagnetic alloy containing Fe, Ni, or Co as the main component (75% or more), barium ferrite, and strontium ferrite. In the case of ferromagnetic alloy particles containing Fe as the main component, the Co content and Ni content thereof are desirably selected according to purpose in the ranges of from 0 to 20% by weight and from 0 to 5% by weight, respectively, based on the amount of Fe. Although ferromagnetic particles having an acicular ratio of from 2 to 20 are usable, the preferred range of acicular ratio is from 4 to 8. For the purposes of regulating anisotropy, coercive force, magnetization amount, and distribution and improving corrosion resistance, etc., atoms other than those specified above may be incorporated into those ferromagnetic particles. Examples of such the other atoms include Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb.

Before being dispersed, the ferromagnetic particles may be treated with, for example, a dispersant, lubricant, surfactant, or antistatic agent which will be described later, as long as this does not adversely influence the surface treatment in the present invention. Such optional treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The fine ferromagnetic alloy particles among the ferromagnetic particles may contain a small amount of a hydroxide or oxide. For obtaining the fine ferromagnetic alloy particles for use in the present invention, a known method may be used. Examples thereof include: a method in which reduction is conducted with an composite organic acid salt (consisting mainly of an oxalate) and a reducing gas such as hydrogen; a method comprising reducing iron oxide with a reducing gas such as hydrogen to obtain Fe or Fe—Co particles or the like; a method comprising pyrolyzing a metal carbonyl compound; a method in which reduction is conducted by adding a reducing agent such as sodium boron hydride, a hypophosphite, or hydrazine to an aqueous solution of a ferromagnetic metal, and a method comprising vaporizing a metal in a low-pressure inert gas to obtain fine particles. The thus-obtained ferromagnetic alloy particles may be used after undergoing a known gradual oxidation treatment. This treatment can be conducted by any of the following: a method comprising immersing the particles in an organic solvent, followed by drying; a method comprising immersing the particles in an organic solvent and feeding an oxygen-containing gas to form an oxide film on the particle surface, followed by drying; and a method in which an oxide film is formed on the particle surface by controlling the partial pressures of oxygen gas and an inert gas, without using an organic solvent.

The ferromagnetic particles have a specific surface area as determined by the BET method of generally from 25 to 80 m$^2$/g, preferably from 35 to 60 m$^2$/g. Specific surface areas of smaller than 25 m$^2$/g are undesirable because noise is increased, while specific surface areas of larger than 80 m$^2$/g are undesirable because satisfactory surface properties are obtained with difficulty. The σ$_s$ (saturation magnetization) of the magnetic iron oxide particles is generally 50 emu/g or higher, preferably 70 emu/g or higher, while the σ$_s$ of the fine ferromagnetic metal particles is preferably 100 emu/g or higher, more preferably from 110 to 170 emu/g. The coercive force thereof is preferably from 500 to 3,000 Oe, more preferably from 800 to 2,500 Oe.

The tap density (measured under the condition of number of tapping: 150 and head: 30 mm) of γ-iron oxide is preferably 0.5 g/ml or higher, more preferably from 0.8 to 1.2 g/ml. In the case of alloy particles, the tap density thereof is desirably from 0.2 to 0.8 g/ml. Tap densities of higher than 0.8 g/ml are apt to result in accelerated oxidation of the ferromagnetic particles during compaction, so that a sufficient σ$_s$ is obtained with difficulty. Tap densities of lower than 0.2 g/ml are apt to result in insufficient dispersion. In the case of using γ-iron oxide, the proportion of divalent iron to trivalent iron is preferably from 0 to 20%, more preferably from 5 to 10%. Further, the amount of cobalt atoms is generally from 0 to 15%, preferably from 2 to 8%, based on the amount of iron atoms.

Hexagonal tabular particles of a hexagonal ferrite may be used in the magnetic layer of the present invention.

Examples of the hexagonal ferrite include substitutional ferrites such as barium ferrite, strontium ferrite, lead ferrite, and calcium ferrite, Co-substituted ferrites, and hexagonal Co particles. Specific examples thereof include barium ferrite and strontium ferrite both of the magnetoplumbite type and barium ferrite and strontium ferrite both of the magnetoplumbite type containing a spinel phase as a part thereof. For the purposes of regulating anisotropy, magnetization amount, distribution, temperature properties, etc., a hexagonal ferrite containing elements other than those of the atoms specified above may be used according to purpose. Examples of such the other elements include Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. Especially preferred are Co— or Ti-substituted barium ferrite and Co— or Ti-substituted strontium ferrite. The SFD (Switching Field Distribution) longitudinal-direction of the magnetic layer is desirably 0.3 or lower, because such the SFD value advantageously results in a narrower coercive-force distribution. The coercive force can be controlled, for example, by regulating the particle diameter or particle thickness of the hexagonal ferrite, by regulating the thickness of the spinal phase of the hexagonal ferrite to a given value, by regulating the amount of a substituent element in the spinel phase to a given value, or by regulating spinel phase substitution sites so as to appear in given positions.

The particle diameter of the hexagonal ferrite for use in this invention means the width of the hexagonal tabular grains, and is determined with an electron microscope. In the present invention, the particle diameter (tabular diameter) of the hexagonal ferrite is preferably from 0.01 to 0.2 $\mu$m, more preferably from 0.03 to 0.1 $\mu$m. The average thickness (tabular thickness) of the fine particles is preferably from 0.001 to 0.2 $\mu$m, more preferably from 0.003 to 0.05 $\mu$m. The tabular ratio (tabular diameter/tabular thickness) is preferably from 1 to 15, more preferably from 3 to 7. Further, the specific surface area of the hexagonal-ferrite magnetic particles as measured by the BET method ($S_{BET}$) is usually from 25 to 100 m$^2$/g, preferably from 40 to 70 m$^2$/g. Specific surface areas of less than 25 m$^2$/g are undesirable because noise is increased, while specific surface areas of more than 100 m$^2$/g are undesirable because satisfactory surface properties are obtained with difficulty. The coercive force of the hexagonal-ferrite magnetic particles is preferably from 1,000 to 4,000 Oe, more preferably from 1,200 to 3,000 Oe. Coercive forces of lower than 1,000 Oe result a decrease of short-wavelength output, while coercive forces of more than 4,000 Oe are undesirable because recording with a head is difficult. The hexagonal-ferrite magnetic particles have a ou of preferably 50 emu/g or higher, more preferably 60 emu/g or higher, and a tap density of preferably 0.5 g/ml or higher, more preferably 0.8 g/ml or higher.

The preferred ranges of other properties of the ferromagnetic particles contained in the magnetic layer of the present invention are as follows. The crystallite size of the ferromagnetic particles is preferably from 100 to 450 Å, more preferably from 100 to 350 Å. The ferromagnetic particles have an r1500 of preferably 1.5 or lower, more preferably 1.0 or lower; r1500 indicates the percentage of residual unreversed magnetization which is determined by bringing the magnetic recording medium into saturation magnetization and then applying a magnetic field of 1,500 Oe thereto in the opposite direction. The ferromagnetic particles are preferably regulated so as to have a water content of from 0.01 to 2%. It is preferred to optimize the water content of the ferromagnetic particles according to the kind of the binder.

The ferromagnetic particles desirably have a neutral to alkaline pH value, in order that the hydrogen chloride generated from the vinyl chloride resin be adsorbed onto the surface of the ferromagnetic particles and be thereby inhibited from passing off the tape to corrode a thin-film magnetic head. The preferred range of the pH thereof is from 7 to 10.

There are cases where the ferromagnetic particles contain soluble inorganic ions such as Na, Ca, Fe, Ni, or Sr. The total amount of these ions should be 300 ppm or smaller, and is preferably 200 ppm or smaller, more preferably 100 ppm or smaller. If the content of such the soluble inorganic ions exceeds 300 ppm, they react with a higher fatty acid fed from the nonmagnetic layer to deposit a metal salt of the fatty acid and this constitutes a space loss.

The void content of the ferromagnetic particles for use in the present invention is desirably low. Specifically, it is preferably 20% by volume or lower, more preferably 5% by volume or lower.

The magnetic layer in the present invention has a $B_r$ (Residual Magnetic Flux Density) of usually from 1,000 to 4,000 Gauss, desirably from 2,500 to 3,500 Gauss, and an SFD (Switching Field Distribution) of desirably 0.6 or lower.

The particle shape may be any of the acicular, granular, ellipsoidal and tabular forms as long as the particles satisfy the above-specified requirements concerning particle size. In the case of acicular ferromagnetic particles, the acicular ratio thereof is preferably 12 or lower. In order for these ferromagnetic particles to have an SFD of 0.6 or lower, the ferromagnetic particles should have a narrow $H_c$ distribution. This may be attained, for example, by improving the particle size distribution of goethite or by inhibiting or retarding the sintering of $\gamma$-hematite.

The carbon black for use in the magnetic layer in the present invention may be, for example, furnace black for rubbers, thermal black for rubbers, coloring black, acetylene black, or the like. The carbon black preferably has a specific surface area of 5 to 500 m$^2$/g, a DBP absorption of 10 to 400 ml/100 g, a particle diameter of 5 to 300 m$\mu$, a pH of 2 to 10, a water content of 0.1 to 10%, and a tap density of 0.1 to 1 g/ml. Specific examples of carbon blacks which can be used in the present invention include BLACKPEARLS 2000, 1300, 1000, 900, 800, 700, and VULCAN XC-72 (manufactured by Cabot Corporation); #80, #60, #55, #50, and #35 (manufactured by Asahi Carbon Co., Ltd., Japan); #2400B, #2300, #900, #1000, #30, #40, and #10B (manufactured by Mitsubishi Kasei Corporation Japan); and CONDUCTEX SC, RAVEN 150, 50, 40, and 15 (manufactured by Columbian Carbon Co., Ltd.). These carbon blacks may be surface-treated with a dispersant or other agent or grafted with a resin before use. A carbon black whose surface has been partly graphitized may also be used. Further, before being added to a magnetic coating solution, the carbon black may be dispersed into a binder. These carbon blacks can be used alone or in combination. In the case of using a carbon black, the amount thereof is preferably from 0.1 to 30% by weight based on the ferromagnetic particles. The carbon black incorporated in the magnetic layer functions to prevent electrification in the layer, to reduce the coefficient of friction of the layer, to impart a light-shielding property for the layer, and to improve the strength of the layer. Such the effects are produced to different degrees depending on the kind of carbon black used. Therefore it is, of course, possible in the present invention to properly use carbon blacks according to the purpose so as to give a magnetic layer and a nonmagnetic layer which differ in the kind, amount, and combination of carbon blacks, on the basis of the above-described properties including particle size, oil absorption, electrical conductivity, and pH. With respect to carbon blacks usable in the magnetic layer of the present invention, reference may be made to, for example, "Carbon Black Binran (Carbon Black Handbook)", edited by Carbon Black Association, Japan.

The abrasive agent for use in the present invention may be selected from known abrasive agents mostly having a Mohs' hardness of 6 or higher, which are used alone or in combination. Examples thereof include α-alumina having an α-conversion of 90% or higher, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. A composite made up of two or more of these abrasive agents (e.g., one obtained by surface-treating one abrasive agent with another) may also be used. Although in some cases these abrasive agents contain compounds or elements other than the main component, the same effect is obtained with such abrasive agents as long as the content of the main component is 90% by weight or higher. These abrasive agents preferably have a particle size of 0.01 to 2 μm. If desired, abrasive agents having different particle sizes may be used in combination, or a single abrasive agent having a widened particle diameter distribution may be used so as to produce the same effect. The abrasive agent preferably has a tap density of 0.3 to 2 g/ml, a water content of 0.1 to 5%, a pH of 2 to 11, and a specific surface area of 1 to 30 $m^2/g$. Although abrasive agents that can be used in the present invention may have any particle shape selected from the acicular, granular, spherical, and die-like forms, a particle shape having a sharp corner as a part of the contour is preferred because abrasive agents of this shape have high abrasive properties. Specific examples of abrasive agents that can be used in the present invention include AKP-20, AKP-30, AKP-50, HIT-50, and HIT-100 (manufactured by Sumitomo Chemical Co., Ltd., Japan); G5, G7, and S-1 (manufactured by Nippon Chemical Industrial Co., Ltd., Japan); and TF-100 and TF-140 (manufactured by Toda Kogyo Corp, Japan). These abrasive agents may be dispersed in a binder before being added to a magnetic coating solution. It is preferable that the number of abrasive agent particles present on the magnetic-layer surface and on the magnetic-layer edges in the magnetic recording medium of the present invention be 5 or larger per 100 $μm^2$.

The nonmagnetic layer which is used in the case of forming the magnetic layer of the present invention thereon is then explained.

The inorganic nonmagnetic particles for use in the nonmagnetic layer of the present invention can be selected from inorganic compounds such as metal oxides, metal carbonates, metal sulfates, metal nitrides, metal carbides, and metal sulfides. Specific examples of such the inorganic compounds include α-alumina having an α-conversion of 90% or higher, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These may be used alone or in combination. Preferred are titanium dioxide, zinc oxide, iron oxide, and barium sulfate, with titanium dioxide being particularly preferred. The particle sizes of these nonmagnetic particles are preferably from 0.005 to 2 μm. It is, however, possible to use a combination of two or more kinds of nonmagnetic particles having different particle sizes if desired. Alternatively, the same effect can be produced by using one kind of nonmagnetic particles having a widened particle diameter distribution. The especially preferred range of the particle size of the inorganic nonmagnetic particles is from 0.01 to 0.2 μm. The tap density thereof is preferably from 0.05 to 2 g/ml, more preferably from 0.2 to 1.5 g/ml. The water content thereof is preferably from 0.1 to 5%, more preferably from 0.2 to 3%. The pH thereof is generally from 2 to 11, preferably from 6 to 9. The specific surface area thereof is generally from 1 to 100 $m^2/g$, preferably from 5 to 50 $m^2/g$, more preferably from 7 to 40 $m^2/g$. The crystallite size thereof is desirably from 0.01 to 2 μm. The oil absorption thereof as measured with DBP is generally from 5 to 100 ml/100 g, preferably from 10 to 80 ml/100 g, more preferably from 20 to 60 ml/100 g.

The specific gravity thereof is generally from 1 to 12, desirably from 3 to 6. The particle shape thereof may be any of the acicular, spherical, polyhedral, tabular, and hexagonal tabular shapes. The ignition loss thereof is preferably 20% or lower. The inorganic particles for use in the present invention preferably have a Mohs' hardness of 4 to 10. The roughness factor of the surface of the particles is preferably from 0.8 to 1.5, more preferably from 0.9 to 1.2. The stearic acid (SA) adsorption thereof is preferably from 1 to 20 $μmol/m^2$, more preferably from 2 to 15 $μmol/m^2$. The nonmagnetic inorganic particles for the lower layer preferably have a heat of wetting by water in the range of from 200 to 600 $erg/cm^2$ at 25° C. A solvent which gives a heat of wetting in the above range can be used. The appropriate number of water molecules present on the surface thereof at 100 to 400° C. is from 1 to 10 per 100 Å.

The inorganic nonmagnetic particles are preferably surface-treated with $Al_2O_3$, $SiO_2$, $TiO_2$, $ZrO_2$, $SnO_2$, $Sb_2O_3$, or ZnO. Of these, $Al_2O_3$, $SiO_2$, $TiO_2$, and $ZrO_2$ are preferred from the standpoint of dispersibility, with $Al_2O_3$, $SiO_2$, and $ZrO_2$ being particularly preferred. These may be used alone or in combination. A treated surface layer formed by co-deposition may be used according to purpose. It is also possible to use a treated surface layer having a structure formed by first treating the particle surface with alumina and then treating the resulting surface layer with silica, or to use a treated surface layer having a structure which is the reverse of the above structure. Although the treated surface layer may be made porous if desired, a homogeneous and dense surface layer is generally preferred.

Specific examples of inorganic nonmagnetic particles that can be used in the present invention include UA5600, UA5605, and Nanotite (manufactured by Showa Denko K.K., Japan); AKP-20, AKP-30, AKP-50, HIT-55, HIT-100, and ZA-G1 (manufactured by Sumitomo Chemical Co., Ltd.); G5, G7, and S-1 (manufactured by Nippon Chemical Industrial Co., Ltd.); TF-100, TF-120, TF-140, R516, DPN250, and DPN250BX (manufactured by Toda Kogyo Corp.); TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, TY-50, and E303 (manufactured by Ishihara Sangyo Kaisha, Ltd., Japan); ECT-52, STT-4D, STT-30D, STT-30, and STT-65C (manufactured by Titan Kogyo K.K., Japan); T-1 (manufactured by Mitsubishi Material Co., Ltd., Japan); NS-O, NS-3Y, and NS-8Y (manufactured by Nippon Shokubai Kagaku Kogyo Co., Ltd., Japan); MT-100S, MT-100T, MT-150W, MT-500B, MT-600B, and MT-100F (manufactured by Teika Co., Ltd.); FINEX-25, BF-1, BF-10, BF-20, BF-1L, and BF-10P (manufactured by Sakai Chemical Industry Co., Ltd., Japan); DEFIC-Y and DEFIC-R (manufactured by Dowa Mining Co., Ltd., Japan); and Y-LOP (manufactured by Titan Kogyo K.K.) and nonmagnetic particles obtained by calcining the same.

Especially preferred inorganic nonmagnetic particles are titanium dioxide particles. Hence, titanium dioxide is described in detail with respect to production processes therefor. For producing titanium dioxide products, the sulfuric acid process and the chlorine process are mainly used. In the sulfuric acid process, a raw ore of ilmenite is digested with sulfuric acid to extract Ti, Fe, etc. as sulfates. The iron sulfate is removed by crystallization, and the remaining titanyl sulfate solution is purified by filtration and then subjected to hydrolysis with heating to thereby precipitate hydrous titanium oxide. This precipitate is separated by filtration and then washed to remove impurities. Calcination of the resulting precipitate at 80 to 1,000° C. after addition of a particle size regulator or the like gives crude titanium oxide. The titanium oxide is of rutile form or anatase form according to the nucleating agent added in hydrolysis. This crude titanium oxide is ground, sieved, and subjected to, e.g., surface treatment, to thereby prepare a titanium dioxide product. In the chlorine process, natural or synthetic rutile is used as the raw ore. The ore is chlorinated under the high-temperature reducing conditions to convert the Ti to $TiCl_4$ and the Fe to $FeCl_2$, and the iron oxide is solidified by cooling and separated from the liquid $TiCl_4$. The crude $TiCl_4$ obtained is purified by rectification and a nucleating agent is added thereto. This crude $TiCl_4$ is instantaneously reacted with oxygen at a temperature of 1,000° C. or higher to obtain crude titanium oxide. For imparting pigmenting properties to the crude titanium oxide yielded by the above oxidative decomposition step, the same finishing technique as in the sulfuric acid process is employed.

The surface treatment of the titanium oxide material may be conducted, for example, as follows. The material is dry-ground, and water and a dispersant are then added thereto. The resulting slurry is subjected to wet grinding, followed by centrifugal separation to separate coarse particles. The resulting slurry of fine particles is then transferred to a surface treatment tank, where surface covering with a metal hydroxide is performed. First, an aqueous solution of a predetermined amount of a salt of Al, Si, Ti, Zr, Sb, Sn, Zn, etc. is added to the slurry and an acid or alkali is added to neutralize the resulting slurry. Thus, a hydrous oxide is formed with which the surface of the titanium oxide particles is covered. The water-soluble salts formed as by-products are removed by decantation, filtration, and washing. The slurry is subjected to final pH adjustment, filtration, and washing with pure water. The resulting cake is dried with a spray dryer or hand dryer. Finally, the dry particles are ground with a jet mill to give a product. In place of such a wet process, the surface treatment can be conducted by passing vapors of $AlCl_3$ and $SiCl_4$ through titanium oxide particles and then passing water vapor to treat the particle surface with Al and Si. With respect to processes for the production of other pigments, reference may be made to "Characterization of Powder Surfaces", Academic Press.

Carbon black may be incorporated into the nonmagnetic layer, whereby the known effect of reducing $R_s$ can be produced. For this purpose, furnace black for rubbers, thermal black for rubbers, coloring black, acetylene black, or the like can be used. The specific surface area of the carbon black is generally from 100 to 500 $m^2/g$, desirably from 150 to 400 $m^2/g$, and the DBP absorption thereof is generally from 20 to 400 ml/100 g, desirably from 30 to 200 ml/100 g. The particle diameter thereof is generally from 5 to 80 m$\mu$, preferably from 10 to 50 m$\mu$, more preferably from 10 to 40 m$\mu$. The carbon black preferably has a pH of 2 to 10, a water content of 0.1 to 10%, and a tap density of 0.1 to 1 g/ml. Specific examples of carbon blacks usable in the present invention include BLACKPEARLS 2000, 1300, 1000, 900, 800, 880, 700, and VULCAN XC-72 (manufactured by Cabot Corporation); #3050B, 3150B, 3250B, #3750B, #3950B, #950, #650B, #970B, #850B, and MA-600 (manufactured by Mitsubishi Kasei Corporation); CONDUCTEX SC, RAVEN 8800, 8000, 7000, 5750, 5250, 3500, 2100, 2000, 1800, 1500, 1255, and 1250 (manufactured by Columbian Carbon Co.); and Ketjen Black EC (manufactured by Akzo Corp.). These carbon blacks may be surface-treated with a dispersant or grafted with a resin before use. A carbon black whose surface has been partly graphitized may also be used. Further, before being added to a coating solution, the carbon black may be dispersed into a binder. These carbon blacks can be used in an amount up to 50% by weight based on the inorganic particles and up to 40% based on the total weight of the nonmagnetic layer. These carbon blacks can be used alone or in combination. With respect to carbon blacks usable in the present invention, reference may be made to, for example, "Carbon Black Binran (Carbon Black Handbook)," edited by Carbon Black Association.

Organic particles that can be used in the present invention include acrylic-styrene resin particles, benzoguanamine resin particles, melamine resin particles, and phthalocyanine pigments. Other usable examples thereof include polyolefin resin particles, polyester resin particles, polyamide resin particles, polyimide resin particles, and poly(ethylene fluoride) resin. For producing these organic particles, techniques such as those described in JP-A-62-18564 and JP-A-60-255827 can be used.

The same binder resins, lubricants, dispersants, additives, solvents, and dispersing techniques as those for upper magnetic layers can be used for the nonmagnetic layer. In particular, with respect to the amount and kind of a binder resin and the amounts and kinds of additives and dispersants, known techniques usable for magnetic layers can be applied.

The nonmagnetic layer in the present invention is a layer containing inorganic nonmagnetic particles as a major component as described above. This nonmagnetic layer according to the present invention may contain a small amount of magnetic particles as long as the effects of the present invention can be exhibited. Specifically, the amount of a magnetic material which can be contained in the nonmagnetic layer is up to 20% by weight based on the amount of the inorganic nonmagnetic particles. If the amount thereof exceeds 20% by weight, the effects of the present invention are lost.

Examples of the vinyl chloride resin which is used in the magnetic layer in the present invention and which may be further used in the nonmagnetic layer include poly(vinyl chloride) resins, vinyl chloride-vinyl acetate resins, vinyl chloride-vinyl acetate-vinyl alcohol resins, and vinyl chloride-vinyl acetate-maleic anhydride copolymers. Preferred examples of the vinyl chloride copolymers include an epoxy group-containing vinyl chloride copolymer. This copolymer comprises vinyl chloride repeating units and repeating units having an epoxy group and optionally repeating units having a polar group such as —$SO_3M$, —$OSO_3M$, —COOM, or —$PO(OM)_2$ (wherein M is a hydrogen atom or an alkali metal). Preferred is an epoxy group-containing vinyl chloride copolymer containing a combination of repeating units having an epoxy group and repeating units having —SO$_3$Na.

The content of the repeating units having a polar group in the copolymer is usually from 0.01 to 5.0% by mole (desirably from 0.5 to 3.0% by mole).

The content of the repeating units having an epoxy group in the copolymer is usually from 1.0 to 30% by mole (desirably from 1 to 20% by mole). The vinyl chloride polymer contains usually from 0.01 to 0.5 mol (desirably from 0.01 to 0.3 mol) of repeating units having an epoxy group per mol of vinyl chloride repeating units.

If the content of repeating units having an epoxy group is lower than 1% by mole, or if the amount of repeating units having an epoxy group is smaller than 0.01 mol per mol of vinyl chloride repeating units, there are cases where the vinyl chloride copolymer cannot be effectively prevented from generating hydrochloric acid gas. On the other hand, if the content of repeating units having an epoxy group is higher than 30% by mole, or if the amount of repeating units having an epoxy group is larger than 0.5 mol per mol of vinyl chloride repeating units, there are cases where the vinyl chloride copolymer has a reduced hardness and use of this copolymer decreases the running durability of the magnetic layer.

If the content of repeating units having any of the above-specified polar groups is lower than 0.01% by mole, there are cases where the ferromagnetic particles show insufficient dispersibility. If the content thereof is higher than 5.0% by mole, there are cases where the copolymer comes to have hygroscopicity, resulting in impaired weatherability.

The number-average molecular weight of the above-described vinyl chloride copolymer is usually from 15,000 to 60,000.

The vinyl chloride copolymer having both epoxy groups and polar groups specified above can be produced, for example, as follows.

For example, in the case where the vinyl chloride copolymer contains epoxy groups and —SO$_3$Na groups as the polar groups, this copolymer can be produced by mixing sodium 2-(meth)acrylamido-2-methylpropanesulfonate, which has a reactive double bond and —SO$_3$Na as a polar group (monomer having a reactive double bond and a polar group), with diglycidyl acrylate at a low temperature and polymerizing the mixture with vinyl chloride under pressure at a temperature of 100° C. or lower.

Besides sodium 2-(meth)acrylamido-2-methylpropanesulfonate, used above, examples of the monomer which has a reactive double bond and a polar group and is used for polar-group introduction in the above-described method include 2-(meth)acrylamido-2-methylpropanesulfonic acid, vinylsulfonic acid and the sodium or potassium salt thereof, ethyl (meth)acrylic acid-2-sulfonate and the sodium or potassium salt thereof, maleic acid (anhydride), (meth)acrylic acid, and (meth)acrylic acid-2-phosphoric acid esters.

For incorporating epoxy groups, glycidyl (meth)acrylate is generally used as a monomer having a reactive double bond and an epoxy group.

Another process usable for producing a copolymer containing polar groups comprises producing a vinyl chloride copolymer having a polyfunctional hydroxyl group, for example, by the polymerization reaction of vinyl chloride with vinyl alcohol and then reacting this copolymer with any of the following compounds containing a polar group and a chlorine atom (with elimination of hydrogen chloride).

ClCH$_2$CH$_2$SO$_3$M
ClCH$_2$CH$_2$OSO$_3$M
ClCH$_2$COOM
ClCH$_2$PO(OM)$_2$

For incorporating epoxy groups in the process utilizing the above-described reaction with elimination of hydrogen chloride, epichlorohydrin is usually used.

The vinyl chloride copolymer may contain units of one or more other monomers. Examples of such the other monomers include vinyl ethers (e.g., methyl vinyl ether, isobutyl vinyl ether, and lauryl vinyl ether), α-monoolefins (e.g., ethylene and propylene), acrylic esters (e.g., methyl (meth) acrylate and (meth)acrylates having a functional group, such as hydroxyethyl (meth)acrylate), unsaturated nitriles (e.g., (meth)acrylonitrile), aromatic vinyls (e.g., styrene and α-methylstyrene), and vinyl esters (e.g., vinyl acetate and vinyl propionate).

These vinyl chloride resins may be used in combination of two or more thereof, and may be used in combination with a conventionally known thermoplastic, thermosetting, or reactive resin or a mixture thereof.

The thermoplastic resin has a glass transition temperature of –100 to 150° C., a number-average molecular weight of generally 1,000 to 200,000, preferably 10,000 to 100,000, and a degree of polymerization of about 50 to 1,000. Examples of such the thermoplastic resins include polymers or copolymers containing structural units derived from vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, or the like, polyurethane resins, and various rubber-type resins.

Examples of the thermosetting or reactive resin include phenolic resins, epoxy resins, thermosetting polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. These resins are described in detail in "Plastic Handbook," published by Asakura Shoten, Japan. It is also possible to use a known resin of the electron beam-curing type for each layer. Examples of such the resins and the production process therefor are described in detail in JP-A-62-256219.

Preferred resins for use in the present invention include combinations of a polyurethane resin with at least one vinyl chloride (type) resins selected from vinyl chloride resins, vinyl chloride-vinyl acetate resins, vinyl chloride-vinyl acetate-vinyl alcohol resins, and vinyl chloride-vinyl acetate-maleic anhydride copolymers, and further include combinations of these with a polyisocyanate.

The polyurethane resins may have a known structure such as a polyester polyurethane, a polyether polyurethane, a polyether polyester polyurethane, a polycarbonate polyurethane, a polyester polycarbonate polyurethane, or a polycaprolactone polyurethane.

For obtaining further improved dispersibility and durability, it is preferred to use, according to need, one or more of the above-enumerated binders which have, incorporated therein through copolymerization or addition reaction, at least one polar group selected from —COOM, —SO$_3$M, —OSO$_3$M, —P=O(OM)$_2$, —O—P=O(OM)$_2$ (where M is a hydrogen atom or an alkali metal salt group), OH, NR$_2$, N$^+$R$_3$ (R represents a hydrocarbon group), epoxy group, SH, CN, and the like. The amount of such the polar groups is generally from 10$^{-1}$ to 10$^{-8}$ mol/g, preferably from 10$^{-2}$ to 10$^{-6}$ mol/g.

Specific examples of those binders that can be used in the present invention are as follows. Examples of vinyl chloride resins include VAGH, VYHH, VMCH, VAGF, VAGD, VROH, VYES, VYNC, VMCC, XYHL, XYSG, PKHH, PKHJ, PKHC, and PKFE (manufactured by Union Carbide Corp.); MPR-TA, MPR-TA5, MPR-TAL, MPR-TSN, MPR-TMF, MPR-TS, and MPR-TM (manufactured by Nisshin Chemical Co., Ltd., Japan); 1000W, DX80, DX81, DX82, and DX83 (manufactured by Denki Kagaku Kogyo K.K., Japan); and MR110, MR100, MR104, and 400X-110A (manufactured by Nippon Zeon Co., Ltd.). Examples of polyurethane resins include Nippollan N2301, N2302, and N2304 (manufactured by Nippon Polyurethane Co. Ltd., Japan); Pandex T-5105, T-R3080, T-5201, Burnock D-400, D-210-80, Crisvon 6109, and 7209 (manufactured by Dainippon Ink & Chemicals, Inc., Japan); Vylon UR8200, UR8300, UR8600, UR5500, RV530, and RV280 (manufactured by Toyobo Co., Ltd., Japan); Daipheramine 4020, 5020, 5100, 5300, 9020, 9022, and 7020 (manufactured by Dainichiseika Co., Ltd., Japan); MX5004 (manufactured by Mitsubishi Chemical Corporation); Sunprene SP-150 (manufactured by Sanyo Chemical Industry, Ltd., Japan); and Salan F310 and F210 (manufactured by Asahi Chemical Industry Co., Ltd., Japan).

The binder resin which can be used in the present invention contains a vinyl chloride resin as a main component, but a polyurethane resin and polyisocyanate can be preferably added to the binder resin containing the vinyl chloride resin to obtain more excellent film physical property for the magnetic layer.

The amount of the binder to be used in the nonmagnetic layer or in the magnetic layer of the present invention is in the range of from 5 to 50% by weight, preferably from 10 to 30% by weight, based on the amount of the inorganic nonmagnetic particles or the ferromagnetic particles, respectively. It is preferred in combination of the vinyl chloride resin, polyurethane resin and polyisocyanate to use a vinyl chloride resin in an amount of 40 to 70% by weight in combination with 15 to 30% by weight of a polyurethane resin and 15 to 30% by weight of a polyisocyanate. In the case of using a polyurethane in the present invention, this resin preferably has a glass transition temperature of −50 to 100° C., an elongation at break of 100 to 2,000%, a stress at break of 0.05 to 10 kg/cm$^2$, and a yield point of 0.05 to 10 kg/cm$^2$.

The magnetic recording medium of the present invention comprises a nonmagnetic support having thereover, at least a magnetic layer comprising mainly ferromagnetic particles and a binder resin. The magnetic layer may have either a single-layer or a multilayer structure. The multilayer structure may be composed of continuously disposed magnetic layers or of magnetic layers separated by a nonmagnetic layer. Namely, as stated hereinabove, a nonmagnetic layer comprising mainly inorganic nonmagnetic particles and a binder resin may be formed between the magnetic layer and the nonmagnetic support. The nonmagnetic layer also may have either a single-layer or a multilayer structure. In the present invention, when a magnetic layer having a single-layer structure is formed on a nonmagnetic layer, the thickness of the magnetic-layer in this case means the thickness of the magnetic layer. When the magnetic layer formed has a multilayer structure composed of continuously disposed magnetic layers, the thickness of the magnetic-layer in this case means the total thickness of the constituent magnetic layers each satisfying the constitution of the present invention. The nonmagnetic layer is referred to also as "lower layer" or "lower nonmagnetic layer." In the case where a lower layer is formed beneath the magnetic layer, this magnetic layer is referred to also as "upper layer" or "upper magnetic layer."

In the case where the magnetic recording medium of the present invention has two or more layers, the individual layers (e.g., the nonmagnetic layer and magnetic layer) can, of course, be formed so as to differ in binder amount, the proportion of a vinyl chloride resin, polyurethane resin, polyisocyanate, or another resin in the binder, the molecular weight or polar-group content of each resin, the aforementioned physical properties of resin, etc. For attaining this, known techniques concerning multilayered recording media are applicable. For example, in the case of varying the binder amount among individual layers, increase in binder amount in the magnetic layer is effective for reducing the marring of the magnetic layer surface, while increase in binder amount in the nonmagnetic layer so as to impart flexibility is effective in improving head touching.

Examples of polyisocyanates for use in constituent layers in the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate; reaction products of these isocyanates with polyalcohols; and polyisocyanates formed through condensation of isocyanates. These isocyanates are commercially available under the trade names of: Coronate L, Coronate HL, Coronate 2030, Coronate 2031, Millionate MR, and Millionate MTL (manufactured by Nippon Polyurethane Co., Ltd.); Takenate D-102, Takenate D-110N, Takenate D-200, and Takenate D-202 (manufactured by Takeda Chemical Industries, Ltd., Japan); and Desmodur L, Desmodur IL, Desmodur N, and Desmodur HL (manufactured by Sumitomo Bayer Co., Ltd., Japan). For each layer, these polyisocyanates may be used alone, or used in combination of two or more thereof, taking advantage of a difference in curing reactivity.

A higher fatty acid may be used in the upper and lower layers in the present invention. This fatty acid is a monobasic fatty acid mostly having 10 to 26 carbon atoms, and it may be saturated or unsaturated and linear or branched. The carbon atom to which COOH is bonded may be a primary, secondary, or tertiary carbon atom. Examples of this higher fatty acid include lauric acid, palmitic acid, myristic acid, stearic acid, behenic acid, oleic acid, linoleic acid, and elaidic acid. The amount of the higher fatty acid added to the nonmagnetic layer is generally from 0.1 to 20% by weight, preferably from 0.1 to 10% by weight, more preferably from 0.1 to 5% by weight, based on the amount of the inorganic nonmagnetic particles (the total amount of all inorganic nonmagnetic particles contained in the layer). In the case of the upper layer, the addition amount of the higher fatty acid is generally from 0.1 to 20% by weight, preferably from 0.1 to 10% by weight, more preferably from 0.1 to 5% by weight, based on the amount of the ferromagnetic metal particles.

Other lubricants and additives may be used in the present invention according to purpose. Additives having a lubricating effect, antistatic effect, dispersing effect, plasticizing effect, and the like may be used. Examples of such additives include molybdenum disulfide, tungsten disulfide, graphite, boron nitride, graphite fluoride, silicone oil, silicones having a polar group, fatty acid-modified silicones, fluorine-containing silicones, fluorine-containing alcohols, fluorine-containing esters, polyolefins, polyglycols, esters of alkylphosphoric acids and alkali metal salts of the acids, esters of alkylsulfuric acids and alkali metal salts of the acids, poly(phenyl ether)s, esters of fluorine-containing alkylsulfuric acids and alkali metal salts of the acids, mono-, di-, or triesters of fatty acids with any one (which may have an unsaturated bond or be branched) of mono-, di-, tri-, tetra-, penta-, and hexahydric alcohols having 12 to 22 carbon atoms (which may have an unsaturated bond or be branched), alkoxyalcohols having 12 to 22 carbon atoms, and mono-, di-, tri-, tetra-, penta-, and hexahydric alcohols having 2 to 12 carbon atoms (which may have an unsaturated bond or be branched), fatty acid esters of monoalkyl ethers of alkylene oxide polymers, fatty acid amides having 8 to 22 carbon atoms, aliphatic amines having 8 to 22 carbon atoms, and esters (which may be branched and unsaturated) of fatty acids having 10 to 24 carbon atoms with alcohols. Specific examples of these compounds include stearic acid amide, myristic acid amide, butyl stearate, oleyl oleate, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Surfactants are also usable. Examples thereof include nonionic surfactants such as those of the alkylene oxide type, glycerin type, glycidol type, and alkylphenol ethylene oxide adduct type; cationic surfactants such as cyclic amines, ester amides, quaternary ammonium salts, hydantoin derivatives, heterocyclic compounds, and phosphonium or sulfonium compounds; anionic surfactants containing an acid radical such as a carboxylic acid, sulfonic acid, phosphoric acid, sulfate, or phosphate radical; and ampholytic surfactants such as amino acids, aminosulfonic acids, esters of sulfuric or phosphoric acid with amino-alcohols, and alkylbetaines. These surfactants are described in detail in "Kaimen Kasseizai Binran (Surfactant Handbook)" (published by Sangyo Tosho K.K., Japan). These additives including lubricants and antistatic agents need not be 100% pure, and may contain impurities such as isomers, unreacted raw materials, by-products, decomposition products, oxidation products, etc., besides the main components. The content of these impurities is preferably 30% or lower, more preferably 10% or lower.

In the present invention, these lubricants and surfactants can be properly used according to need so as to differ in kind and amount between the nonmagnetic layer and the magnetic layer. For example, fatty acids having different melting points are used for the nonmagnetic layer and the magnetic layer, respectively, to control migration to the surface; esters different in boiling point or polarity are used to control migration to the surface; the surfactant amounts are regulated to improve the stability of coating; and a larger lubricant amount is used for the nonmagnetic layer to improve lubricating effect. It is a matter of course that the manners of using lubricants or surfactants are not limited to these examples.

Part or all of the additives to be used in the present invention may be added at any step in a coating solution preparation process. For example, it is possible to mix the additives with ferromagnetic particles prior to a kneading step; to add the additives during the kneading of ferromagnetic particles with a binder and a solvent; to add the additives at a dispersing step; to add the additives after dispersion; or to add the additives immediately before coating.

Examples of marketed lubricants that can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid (manufactured by Nippon Oil & Fats Co., Ltd., Japan); oleic acid (manufactured by Kanto Chemical Co., Inc., Japan); FAL-205 and FAL-123 (manufactured by Takemoto Oil & Fat Co., Ltd., Japan); Enujerubu LO, Enujorubu IPM, and Sansosyzer E4030 (manufactured by Shin Nihon Rika K.K., Japan); TA-3, KF-96, KF-96L, KF-96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 (manufactured by Shin-Etsu Chemical Co., Ltd., Japan); Armide P, Armide C, and Armoslip CP (manufactured by Lion Armide Co., Ltd.); Duomine TDO (manufactured by Lion Fat and Oil Co., Ltd., Japan); BA-41G (manufactured by Nisshin Oil Mills Co., Ltd., Japan); and Profan 2021E, New Pole PE61, Ionet MS-400, Ionet MO-200, Ionet DL-200, Ionet DS-300, Ionet DS-1000, and Ionet DO-200 (manufactured by Sanyo Chemical Industries, Co., Ltd.).

Examples of organic solvents that can be used in the present invention include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ethers, glycol monoethyl ethers, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; and other compounds such as N,N-dimethylformamide and hexane. These solvents may be used in arbitrary proportions. These organic solvents need not be 100% pure, and may contain impurities such as isomers, unreacted raw materials, by-products, decomposition products, oxidation products, water, etc., besides the main components. The content of these impurities is preferably 30% or lower, more preferably 10% or lower. In the case of forming a lower layer, the organic solvent used for this lower layer may differ in kind or amount from the organic solvent used for an upper layer. For example, a highly volatile solvent is used for the lower layer to improve surface properties; a solvent having a high surface tension (e.g., cyclohexanone or dioxane) is used for the magnetic layer to enhance coating stability; or a solvent having a high solubility parameter is used for the magnetic layer to heighten packing density. However, techniques of using organic solvents should not, of course, be construed as being limited to these examples.

The thickness of each constituent layer of the magnetic recording medium according to the present invention is as follows. In the case where the recording medium is composed of a nonmagnetic support and a magnetic layer, the thickness of the nonmagnetic support is generally from 1 to 100 $\mu$m, preferably from 6 to 20 $\mu$m, and the thickness of the magnetic layer is generally from 0.5 to 10 $\mu$m, preferably from 1 to 5 $\mu$m. In the case where the recording medium is composed of a nonmagnetic support, a nonmagnetic layer, and a magnetic layer, the thickness of the nonmagnetic layer is generally from 0.5 to 10 $\mu$m, preferably from 1 to 5 $\mu$m, and the thickness of the magnetic layer is generally from 0.05 to 1.0 μm, preferably from 0.05 to 0.8 μm, with the thickness of the nonmagnetic support being the same as in the above case. The total thickness of the magnetic layer and the nonmagnetic layer is from 1/100 to 2 times the thickness of the nonmagnetic support. An undercoating layer may be provided between the nonmagnetic support and the lower layer in order to improve adhesion. The thickness of this undercoating layer may be generally from 0.01 to 2 μm, preferably from 0.02 to 0.5 μm. Further, a back coating layer may be provided on the nonmagnetic support on the side opposite to the magnetic layer. The thickness of this back coating layer may be generally from 0.1 to 2 μm, preferably from 0.3 to 1.0 μm. As these undercoating layer and back coating layer, known layers can be used.

The nonmagnetic support for use in the present invention may be a known film. Examples thereof include films of polyesters such as poly(ethylene terephthalate) and poly (ethylene naphthalate), polyolefins, cellulose triacetate, polycarbonates, polyamides, polyimides, poly(amide-imide)s, polysulfone, aramids, aromatic polyamides, and polybenzoxazole. If desired, a laminate type support as disclosed in JP-A-3-224127 may be used in order to modify the roughness of the magnetic-layer surface and the base surface. These supports may be subjected previously to corona discharge treatment, plasma treatment, adhesion-promoting treatment, heat treatment, dust-removing treatment, etc.

In order to attain the object of the present invention, it is preferred to employ a nonmagnetic support having a center-line average (surface) roughness (defined by JIS B 0601), Rai of generally 0.03 μm or lower, preferably 0.02 μm or lower, more preferably 0.01 μm or lower. It is preferred that the nonmagnetic supports not only have such the reduced center-line average (surface) roughness, but also be free from projections of 1 μm or larger. The state of the surface roughness of a support can be freely controlled by changing the size and amount of a filler which is incorporated into the support if desired. Examples of the filler include oxides or carbonates of Ca, Si, and Ti and fine organic powders such as acrylic powder.

The nonmagnetic support for use in the present invention preferably has an F-5 value in the tape running direction of 5 to 50 kg/mm$^2$ and an F-5 value in the tape width direction of 3 to 30 kg/mm$^2$. Although the F-5 value in the tape running direction generally is higher than that in the tape width direction, this does not apply in the case where the width-direction strength, in particular, should be enhanced. The degrees of thermal shrinkage of the support in the tape running direction and in the tape width direction are preferably 3% or lower, more preferably 1.5% or lower, under conditions of 100° C. and 30 minutes, and are preferably 1% or lower, more preferably 0.5% or lower, under the conditions of 80° C. and 30 minutes. The strength at break thereof in each of both directions is desirably from 5 to 100 kg/mm$^2$, and the modulus of elasticity is desirably from 100 to 2,000 kg/mm$^2$.

A process for preparing a magnetic coating solution to be used for producing the magnetic recording medium of the present invention comprises at least a kneading step and a dispersing step, and may further comprise a mixing step that may be conducted, if needed, before and after the two steps. Each step may include two or more stages. Each of the materials for use in the present invention, including ferromagnetic particles, binder, carbon black, abrasive agent, antistatic agent, lubricant, and solvent, may be added in any step either at the beginning of or during the step. Further, the individual raw materials may be added portion-wise in two or more steps. For example, a polyurethane may be added portion-wise in each of the kneading step, the dispersing step, and the mixing step for viscosity adjustment after the dispersion. A nonmagnetic coating solution may be prepared in the same manner as for the magnetic coating solution.

Conventionally known manufacturing techniques can, of course, be used as part of the process to attain the object of the present invention. Examples of usable kneading apparatus include an open kneader, a continuous kneader, and a pressure kneader. In kneading, ferromagnetic particles or inorganic nonmagnetic particles are kneaded together with all or part (preferably at least 30% by weight) of a binder resin and in an amount of from 15 to 500 parts by weight of a solvent per 100 parts by weight of the ferromagnetic particles or inorganic nonmagnetic particles. Details of this kneading treatment are given in JP-A-1-106338 and JP-A-64-79274. For preparing a nonmagnetic coating solution, use of a dispersing medium having a high specific gravity, such as zirconia beads or metal beads, is desirable.

As exemplary coating apparatus and methods for producing multilayered magnetic recording media of the present invention, the following constitutions may be proposed.

1. A lower layer is first applied with a coating apparatus commonly used for the application of magnetic coating solutions, e.g., a gravure coating, roll coating, blade coating, or extrusion coating apparatus, and an upper layer is applied, after the lower layer is dried, by means of a support-pressing extrusion coater as disclosed in JP-B-1-46186, JP-A-60-238179, and JP-A-2-265672.

2. A lower layer is first applied with a coating apparatus commonly used for the application of magnetic coating solutions, e.g., a gravure coating, roll coating, blade coating, or extrusion coating apparatus, and an upper layer is then applied, while the lower layer is in a wet state, by means of a support-pressing extrusion coater as disclosed in JP-B-1-46186, JP-A-60-238179, and JP-A-2-265672.

3. An upper layer and a lower layer are applied almost simultaneously using a single coating head having therein two slits for passing coating solutions, as disclosed in JP-A-63-88080, JP-A-2-17971, and JP-A-2-265672.

4. An upper layer and a lower layer are applied almost simultaneously with an extrusion coater equipped with a back-up roll, as disclosed in JP-A-2-174965.

In order to prevent deterioration of the electromagnetic characteristics of the magnetic recording medium due to aggregation of ferromagnetic particles, shearing is desirably applied to the coating solution in the coating head by a method as disclosed in JP-A-62-95174 and JP-A-1-236968. The viscosity of each coating solution should be in the range as specified in JP-A-3-8471.

In the present invention, the methods described above are preferably used for producing a multilayered magnetic recording medium. Also in the case of forming two magnetic layers and one nonmagnetic layer, each of the above-described methods is easily applicable to the formation of these three layers. It is, however, possible to use a method in which a nonmagnetic layer is applied and dried before a lower magnetic layer and an upper magnetic layer are simultaneously formed thereon, or a method in which a nonmagnetic layer and a lower magnetic layer are simultaneously formed and dried before an upper magnetic layer is formed thereon.

A known orientation apparatus may be used for producing the magnetic recording medium of the present invention. However, homopolar-counter cobalt magnets, solenoid magnets, and superconducting magnets are preferred. The place in which the coating is dried is preferably made controllable by controlling the temperature and amount of the air fed for drying or by controlling the rate of coating. The rate of coating is from 20 to 1,000 m/min, and the temperature of the drying air is preferably 60° C. or higher. It is preferred to use a combination of a solenoid having a magnetic force of 1,000 G or higher and a cobalt magnet having a magnetic force of 2,000 G or higher. It is also preferred to conduct moderate drying prior to the orientation treatment so as to maximize orientation after drying. In the case where the present invention is applied to a disk-form recording medium, orientation for randomization is necessary.

Examples of calendering rolls that can be used for producing the magnetic recording medium of the present invention include rolls of a heat-resistant plastic (e.g., an epoxy, a polyimide, a polyamide, or a poly(imide-amide)), and metal rolls. The calendering temperature is preferably 70° C. or higher, more preferably 80° C. or higher. The linear pressure is preferably from 200 to 500 kg/cm, more preferably from 300 to 400 kg/cm.

The magnetic recording medium of the present invention has the following properties. The coefficients of friction to SUS420J of the magnetic-layer surface and the opposite-side surface are generally 0.5 or lower, desirably 0.3 or lower. The inherent surface resistivity of the magnetic layer is desirably from $10^4$ to $10^{11}$ $\Omega$/sq, while that of the back-side surface is desirably from $10^4$ to $10^8$ $\Omega$/sq. The electrification potential thereof is desirably from $-500$ V to $+500$ V. The modulus of elasticity at 0.5% elongation of the magnetic layer is desirably from 100 to 2,000 kg/mm² in both the running and width directions, and the strength at break thereof is desirably from 1 to 30 kg/cm². The modulus of elasticity of the magnetic recording medium is desirably from 100 to 1,500 kg/mm² in both the running and width directions, the residual elongation thereof is desirably 0.5% or lower, and the thermal shrinkage thereof at any temperature not higher than 100° C. is preferably 1% or lower, more preferably 0.5% or lower, most preferably 0.1% or lower.

The modulus of elasticity of the magnetic layer in both the length (i.e., machine) and width directions is from 100 to 2,000 kg/mm², while that of the nonmagnetic layer in both the length and width directions is from 100 to 2,000 kg/mm². The upper layer and the lower layer may have different strengths according to purpose.

The residual solvent content in the magnetic layer and nonmagnetic layer is preferably 100 mg/m² or lower, more preferably 10 mg/m² or lower.

The void content in the magnetic layer is preferably 30% by volume or lower, more preferably 10% by volume or lower.

Magnetic characteristics of the magnetic recording medium of the present invention are as follows. When measured in a magnetic field of 5 kOe, the squareness ratio thereof in the tape running direction is generally 0.70 or higher, preferably 0.80 or higher, more preferably 0.90 or higher, and the squareness ratio thereof in each of the two directions perpendicular to the tape running direction is preferably not higher than 80% of the squareness ratio in the tape running direction. The SFD of the magnetic layer is desirably 0.6 or lower.

The magnetic recording medium of the present invention is more effective when it has a magnetic layer and a nonmagnetic layer. It can be made to have a difference in physical property between the magnetic layer and the non-magnetic layer according to purpose, as can be easily presumed. For example, the nonmagnetic layer is made to have a heightened modulus of elasticity to improve running durability and, at the same time, the magnetic layer is made to have a lower modulus of elasticity than the nonmagnetic layer to improve the head touching of the magnetic recording medium

EXAMPLE

The present invention will be explained below in more detail by reference to the following Examples, but the present invention should not be construed as being limited thereto. In the following examples, all parts are by weight.

Basic Formulations (1) Magnetic Layer

| | |
|---|---|
| Ferromagnetic metal particles | 100 parts |
| Composition | Fe/Co = 90/10 |
| $H_c$ | 1,800 Oe |
| Specific surface area (by BET) | 58 m²/g |
| Crystallite size | 175 Å |
| Major axis length | 0.1 μm |
| Acicular ratio | 7 |
| $\sigma_s$ | 130 emu/g |
| pH | 8.6 |
| Water-soluble Na | 70 ppm |
| Water-soluble Ca | 10 ppm |
| Water-soluble Fe | 10 ppm |
| Vinyl chloride copolymer ("MR-110", manufactured by Nippon Zeon Co., Ltd.) | 12 parts |
| —SO₃Na content | 5 × 10⁻⁶ eq/g |
| Degree of polymerization | 350 |
| Epoxy group (3.5 wt % epoxy monomer units) | |
| Polyester polyurethane resin | 3 parts |
| Neopentyl glycol/caprolactonepolyol/MDI = 0.9/2.6/1 (by mol) | |
| Containing 1 × 10⁻⁴ eq/g of —SO₃Na group | |
| Polyisocyanate ("Coronate L", manufactured by Nippon Polyurethane Co., Ltd.) | 3 parts |
| α-Alumina (particle size: 0.3 μm) | 5 parts |
| Carbon black (particle size: 0.10 μm) | 0.5 parts |
| Butyl stearate | 1 part |
| Stearic acid | 2 parts |
| Methyl ethyl ketone | 150 parts |
| Cyclohexanone | 50 parts |

(2) Nonmagnetic Layer

| | |
|---|---|
| Inorganic nonmagnetic particles, TiO₂ | 90 parts |
| Crystal system | rutile |
| Average primary particle diameter | 0.035 μm |
| Specific surface area (by BET) | 40 m²/g |
| pH | 7 |
| TiO₂ content | 90% or higher |
| DBP oil absorption | 27–38 g/100 g |
| Surface-treating agent, Al₂O₃ | 1.5 wt % |
| Carbon black | 10 parts |
| Average primary particle diameter | 16 nm |
| DBP oil absorption | 80 ml/100 g |
| pH | 8.0 |
| Specific surface area (by BET) | 250 m²/g |
| Volatile content | 1.5% |
| Vinyl chloride copolymer ("MR-110", manufactured by Nippon Zeon Co., Ltd.) Containing —SO₃Na and epoxy group | 12 parts |
| Polyester polyurethane resin | 5 parts |
| Neopentyl glycol/caprolactonepolyol/MDI = 0.9/2.6/1 (by mol) | |
| Containing 1 × 10⁻⁴ eq/g of —SO₃Na group | |
| Polyisocyanate ("Coronate L", manufactured by Nippon Polyurethane Co., Ltd.) | 3 parts |

-continued

| | |
|---|---|
| Butyl stearate | 1 part |
| Stearic acid | 2 parts |
| Methyl ethyl ketone | 150 parts |
| Cyclohexanone | 50 parts |

With respect to each of the above two coating solutions, the ingredients were kneaded with a continuous kneader and then dispersed with a sand mill. To each of the resulting dispersions was added a polyisocyanate in an amount of 1 part for the dispersion for a nonmagnetic-layer and in an amount of 3 parts for the dispersion for a magnetic-layer. To each dispersion was added 40 parts of butyl acetate. The resulting mixtures each was filtered through a filter having an average opening diameter of 1 $\mu$m. Thus, a coating solution for a nonmagnetic-layer and a coating solution for a magnetic-layer were prepared.

Basic Processes for Producing Magnetic Recording Medium

A. For Medium having Magnetic Layer without Nonmagnetic Layer

The thus-obtained coating solution for a magnetic-layer was applied with a dry thickness of 0.3 $\mu$m onto a poly (ethylene terephthalate) support having a thickness of 10 $\mu$m and a center-line (surface) roughness of 0.01 $\mu$m. While the coating layer was still in a wet state, orientation was conducted using a cobalt magnet having a magnetic force of 3,000 G and a solenoid having a magnetic force of 1,500 G. After the resulting coating layers was dried, a back layer having a dry thickness of 0.5 $\mu$m was coated. Calendering was then conducted at a linear pressure of 300 kg/cm and a temperature of 90° C. using a calender in which all the rolls were metal rolls arranged in a 7-stage stack. The calendered sheet was slit into a ½ inch width to produce a data storage tape.

B. For Medium having Nonmagnetic Layer and Magnetic Layer

In the case of forming a nonmagnetic layer beneath a magnetic layer, the two coating solutions obtained were applied by simultaneous multiple layered coating method as follows. The coating solution for a nonmagnetic-layer was applied first with a dry thickness of 2.7 $\mu$m to a poly (ethylene terephthalate) support having a thickness of 10 $\mu$m and a center-line (surface) roughness of 0.01 $\mu$m, and the coating solution for a magnetic-layer was applied thereon immediately thereafter in such an amount as to give a magnetic layer having a thickness of 0.3 $\mu$m. While the two coating layers were still in a wet state, orientation was conducted using a cobalt magnet having a magnetic force of 3,000 G and a solenoid having a magnetic force of 1,500 G. After the resulting structure was dried, a back layer having a dry thickness of 0.5 $\mu$m was formed. Calendering was then conducted at a linear pressure of 300 kg/cm and a temperature of 90° C. using a calender in which all the rolls were metal rolls arranged in a 7-stage stack. The calendered sheet was slit into a ½ inch width, and a 400-m portion of the slit sheet was wound in a ½ inch cartridge of the type 3480 to produce a data storage tape.

(3) Thin-film Magnetic Head

Recording Head:

Structure: Inductive head comprising a two-turn thin-film coil sandwiched between Co-based amorphous magnetic thin-film yokes.

Track width: 80 $\mu$m

Gap length: 0.8 $\mu$m

Reproducing Head:

Structure: Double-shielded shunt bias MR (magnetoresistive) head, with the MR element being a thin film of an Fe—Ni alloy (Permalloy).

Track width: 45 $\mu$m

Gap length. 0.3 $\mu$m (4) Magnetic Recording System

The recording and reproducing heads were mounted in drive F613A (manufactured by Fujitsu Ltd.) which is a magnetic-tape recording apparatus for 3480 type ½ inch cartridges. Thus, a magnetic recording system was fabricated.

In the following examples and comparative examples, samples were produced according to Table 1 (magnetic layer) and Table 2 (nonmagnetic layer).

TABLE 1

| | Magnetic Layer | | | | |
|---|---|---|---|---|---|
| | Ferromagnetic particles | | | | |
| | | Surface-treating agent | | | |
| | Kind | Kind | Amount ($\mu$mol/m$^2$) | Binder resin, Kind | Thickness ($\mu$m) |
| Example 1 | ferromagnetic metal particles | phenyl-phosphonic acid | 3 | MR110/ polyurethane | 3 |
| Example 2 | ferromagnetic metal particles | epoxy compound | 3 | MR110/ polyurethane | 3 |
| Example 3 | ferromagnetic metal particles | SC agent | 3 | MR110/ polyurethane | 3 |
| Example 4 | ferromagnetic metal particles | phenyl-phosphonic acid | 0.5 | MR110/ polyurethane | 3 |
| Example 5 | ferro- | phenyl- | 10 | MR110/ | 3 |

TABLE 1-continued

| | Magnetic Layer | | | | |
|---|---|---|---|---|---|
| | Ferromagnetic particles | | | | |
| | | Surface-treating agent | | | |
| | Kind | Kind | Amount ($\mu$mol/m$^2$) | Binder resin, Kind | Thickness ($\mu$m) |
| | magnetic metal particles | phosphonic acid | | polyurethane | |
| Example 6 | ferromagnetic metal particles | phenylphosphonic acid | 3 | MR110/ polyurethane | 0.3 |
| Example 7 | ferromagnetic metal particles | phenylphosphonic acid | 3 | MR110/ polyurethane | 0.3 |
| Example 8 | ferromagnetic metal particles | phenylphosphonic acid | 3 | MR110/ polyurethane | 0.3 |
| Example 9 | ferromagnetic metal particles | phenylphosphonic acid | 3 | MR110/ polyurethane | 0.3 |
| Example 10 | ferromagnetic metal particles | phenylphosphonic acid | 3 | MR110/ polyurethane | 1 |
| Comparative Example 1 | CrO$_2$ | none | — | polyurethane | 3 |
| Comparative Example 2 | ferromagnetic metal particles | none | — | polyurethane | 3 |
| Comparative Example 3 | ferromagnetic metal particles | none | — | MR110/ polyurethane | 3 |
| Comparative Example 4 | ferromagnetic metal particles | none | — | MR110/ polyurethane | 0.3 |

TABLE 2

| | Nonmagnetic Layer | | | | | |
|---|---|---|---|---|---|---|
| | Inorganic nonmagnetic particles | | | | | |
| | | Particle | Surface-treating agent | | | |
| | Kind | diameter ($\mu$m) | Kind | Amount ($\mu$mol/m$^2$) | Binder resin, Kind | Thickness ($\mu$m) |
| Example 1 | no nonmagnetic layer | — | — | — | — | — |
| Example 2 | no nonmagnetic layer | — | — | — | — | — |
| Example 3 | no nonmagnetic layer | — | — | — | — | — |

TABLE 2-continued

| | Nonmagnetic Layer | | | | |
|---|---|---|---|---|---|
| | Inorganic nonmagnetic particles | | | | |
| | | Particle | Surface-treating agent | | |
| | Kind | diameter ($\mu$m) | Kind | Amount ($\mu$mol/m$^2$) | Binder resin, Kind | Thickness ($\mu$m) |
| Example 4 | no nonmagnetic layer | — | — | — | — | — |
| Example 5 | no nonmagnetic layer | — | — | — | — | — |
| Example 6 | TiO$_2$ rutile | 0.03 | none | — | MR110/ polyurethane | 2.7 |
| Example 7 | TiO$_2$ rutile | 0.03 | phenyl-phosphonic acid | 3 | MR110/ polyurethane | 2.7 |
| Example 8 | $\alpha$Fe$_2$O$_3$ | 0.02 | phenyl-phosphonic acid | 3 | MR110/ polyurethane | 2.7 |
| Example 9 | BaSO$_4$ | 0.04 | phenyl-phosphonic acid | 3 | MR110/ polyurethane | 2.7 |
| Example 10 | TiO$_2$ rutile | 0.03 | phenyl-phosphonic acid | 3 | MR110/ polyurethane | 2 |
| Comparative Example 1 | no nonmagnetic layer | — | — | — | — | — |
| Comparative Example 2 | no nonmagnetic layer | — | — | — | — | — |
| Comparative Example 3 | no nonmagnetic layer | — | — | — | — | — |
| Comparative Example 4 | TiO$_2$ rutile | 0.03 | — | — | — | 2 |

Example 1

Phenylphosphonic acid was added to the basic formulation for magnetic layer as a surface-treating agent for the ferromagnetic metal particles in an amount of 2.7 parts simultaneously with the ferromagnetic metal particles and the binder resins. This amount corresponds to 3 $\mu$mol per m$^2$ of the surface area of the ferromagnetic metal particles. No nonmagnetic layer was formed.

Example 2

The epoxy compound represented by the following chemical formula was added to the basic formulation for magnetic layer as a surface-treating agent for the ferromagnetic metal particles in an amount of 7.9 parts simultaneously with the ferromagnetic metal particles and the binder resins. This amount corresponds to 3 $\mu$mol per m$^2$ of the surface area of the ferromagnetic metal particles. No nonmagnetic layer was formed.

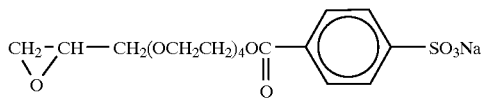

Example 3

$\gamma$-Glycidoxypropyltrimethoxysilane, which is a silane coupling agent (SC agent), was added to the basic formulation for magnetic layer as a surface-treating agent for the ferromagnetic metal particles in an amount of 34 parts simultaneously with the ferromagnetic metal particles and the binder resins. This amount corresponds to 3 $\mu$mol per m$^2$ of the surface area of the ferromagnetic metal particles. No nonmagnetic layer was formed.

Example 4

Phenylphosphonic acid was added to the basic formulation for magnetic layer as a surface-treating agent for the ferromagnetic metal particles in an amount of 0.46 parts simultaneously with the ferromagnetic metal particles and the binder resins. This amount corresponds to 0.5 $\mu$mol per m$^2$ of the surface area of the ferromagnetic metal particles. No nonmagnetic layer was formed.

Example 5

Phenylphosphonic acid was added to the basic formulation for magnetic layer as a surface-treating agent for the ferromagnetic metal particles in an amount of 9.2 parts simultaneously with the ferromagnetic metal particles and the binder resins. This amount corresponds to 10 $\mu$mol per m$^2$ of the surface area of the ferromagnetic metal particles. No nonmagnetic layer was formed.

Example 6

Phenylphosphonic acid was added to the basic formulation for magnetic layer as a surface-treating agent for the ferromagnetic metal particles in an amount of 2.7 parts simultaneously with the ferromagnetic metal particles and the binder resins. This amount corresponds to 3 μmol per m² of the surface area of the ferromagnetic metal particles. The coating solution for a nonmagnetic-layer prepared according to the basic formulation for nonmagnetic layer was used. A recording medium having a multilayer constitution was produced by Basic Process B.

Example 7

Phenylphosphonic acid was added to the basic formulation for magnetic layer as a surface-treating agent for the ferromagnetic metal particles in an amount of 2.7 parts simultaneously with the ferromagnetic metal particles and the binder resins. This amount corresponds to 3 μmol per m² of the surface area of the ferromagnetic metal particles. A coating solution for a nonmagnetic-layer was prepared according to a formulation which was the same as the basic formulation for a nonmagnetic layer, except that 2.4 parts (corresponding to 3 μmol per m² of the surface area of the inorganic nonmagnetic particles) of phenylphosphonic acid as a surface-treating agent for the inorganic nonmagnetic particles was added simultaneously with the inorganic nonmagnetic particles and the binder resins. A recording medium having a multilayer constitution was produced by Basic Process B.

Example 8

Phenylphosphonic acid was added to the basic formulation for a magnetic layer as a surface-treating agent for the ferromagnetic metal particles in an amount of 2.7 parts simultaneously with the ferromagnetic metal particles and the binder resins. This amount corresponds to 3 μmol per m² of the surface area of the ferromagnetic metal particles. A coating solution for a nonmagnetic-layer was prepared according to a formulation which was the same as the basic formulation for a nonmagnetic layer, except that the inorganic nonmagnetic particles were replaced with the following α-$Fe_2O_3$, and that 2.1 parts (corresponding to 3 μmol per m² of the surface area of the nonmagnetic particles) of phenylphosphonic acid as a surface-treating agent was added simultaneously with the inorganic nonmagnetic particles and the binder resins. A recording medium having a multilayer constitution was produced by Basic Process B.

| | |
|---|---|
| α-$Fe_2O_3$ | 90 parts |
| Average primary particle diameter | 0.03 μm |
| Specific surface area (by BET) | 50 m²/g |

Example 9

Phenylphosphonic acid was added to the basic formulation for a magnetic layer as a surface-treating agent for the ferromagnetic metal particles in an amount of 2.7 parts simultaneously with the ferromagnetic metal particles and the binder resins. This amount corresponds to 3 μmol per m² of the surface area of the ferromagnetic metal particles. A coating solution for a nonmagnetic-layer was prepared according to a formulation which was the same as the basic formulation for a nonmagnetic layer, except that the inorganic nonmagnetic particles were replaced with $BaSO_4$, and that 3.0 parts (corresponding to 3 μmol per m² of the surface area of the nonmagnetic particles) of phenylphosphonic acid as a surface-treating agent was added simultaneously with the inorganic nonmagnetic particles and the binder resins A recording medium having a multilayer constitution was produced by Basic Process B.

| | |
|---|---|
| $BaSO_4$ | 90 parts |
| Average primary particle diameter | 0.04 μm |
| Specific surface area (by BET) | 50 m²/g |

Example 10

Phenylphosphonic acid was added to the basic formulation for a magnetic layer as a surface-treating agent for the ferromagnetic metal particles in an amount of 2.7 parts simultaneously with the ferromagnetic metal particles and the binder resins. This amount corresponds to 3 μmol per m² of the surface area of the ferromagnetic metal particles. A coating solution for a nonmagnetic-layer formation was produced according to a formulation which was the same as the basic formulation for a nonmagnetic layer, except that 2.4 parts (corresponding to 3 μmol per m² of the surface are of the nonmagnetic particles) of phenylphosphonic acid as a surface-treating agent for the inorganic nonmagnetic particles was added simultaneously with the inorganic nonmagnetic particles and the binder resins. A recording medium having a multilayer constitution was produced by Basic Process B. The thickness of the magnetic layer was regulated to 1.0 μm, and that of the nonmagnetic layer was regulated to 2.0 μm.

Comparative Example 1

A sample was produced by Basic Process A according to a formulation which was the same as the basic formulation for a magnetic layer, except that the ferromagnetic metal particles were replaced with the following $CrO_2$ magnetic material, and that the vinyl chloride copolymer was omitted and the amount of the polyester polyurethane resin was changed to 15 parts.

Comparative Example 2

A sample was produced by Basic Process A according to a formulation which was the same as the basic formulation for a magnetic layer, except that the vinyl chloride copolymer was omitted and the amount of the polyester polyurethane resin was changed to 15 parts.

Comparative Example 3

A sample was produced by Basic Process A according to the basic formulation for a magnetic layer.

Comparative Example 4

A sample was produced by Basic Process B in which both the magnetic layer and the nonmagnetic layer were formed according to the respective basic formulations. The thickness of the magnetic layer was regulated to 0.3 μm, and that of the nonmagnetic layer was regulated to 2.0 μm.

The samples obtained above were evaluated by the following methods. The results obtained are shown in Table 3.

TABLE 3

| | $H_c$ (Oe) | $R_r$ (G) | $R_a$ (nm) | Reproduced output (%) | Head fouling | Permalloy corrosion |
|---|---|---|---|---|---|---|
| Example 1 | 1830 | 2900 | 3 | 910 | 5 | 4 |
| Example 2 | 1815 | 2800 | 3.5 | 860 | 5 | 4 |
| Example 3 | 1810 | 2750 | 3.7 | 850 | 5 | 4 |
| Example 4 | 1800 | 2750 | 3.5 | 870 | 5 | 4 |
| Example 5 | 1820 | 2850 | 3.2 | 900 | 5 | 4 |
| Example 6 | 1830 | 2900 | 2.6 | 950 | 5 | 5 |
| Example 7 | 1830 | 2900 | 2.2 | 1000 | 5 | 5 |
| Example 8 | 1830 | 2900 | 2.3 | 985 | 5 | 5 |
| Example 9 | 1830 | 2900 | 2.4 | 960 | 5 | 5 |
| Example 10 | 1830 | 2900 | 2.6 | 960 | 5 | 5 |
| Comparative Example 1 | 520 | 1400 | 8 | 100 | 1 | 4 |
| Comparative Example 2 | 1750 | 2500 | 6 | 720 | 2 | 4 |
| Comparative Example 3 | 1800 | 2750 | 5 | 760 | 5 | 1 |
| Comparative Example 4 | 1800 | 2750 | 4 | 880 | 5 | 2 |

Evaluation Methods $H_c$, $B_r$:

Using a vibrating sample magnetometer (manufactured by Toei Kogyo K.K., Japan), measurement was made at an $H_m$ of 5 kOe.

Surface Roughness $R_a$:

Surface roughness was measured with 3D-MIRAU. The center-line (surface) roughness, $R_a$, of an area having dimensions of about 250×250 μm was measured using TOPO3D, (manufactured by WYKO Co.), by the MIRAU method.

Reproduced Output (4.5 MHz output), 4.5 MHz signals were recorded and reproduced, while the tape was run at 3.5 m/sec. The output of the reproduced signals was measured with an oscilloscope. Each output value is shown as a relative value, with the output value for Comparative Example 1 being taken as 100%.

Head Fouling (after storage at 60° C., 90%):

Each sample was stored in a 60° C., 90% RH atmosphere for 4 weeks, and then subjected to five successive full-winding operations on the aforementioned drive. The degree of the resulting fouling deposit on the head was evaluated in five grades.

5: the width of the fouling deposit on the magnetic head was below 15 μm

4: the width of the fouling deposit on the magnetic head was 15–30 μm

3: the width of the fouling deposit on the magnetic head was 31–45 μm

2: the width of the fouling deposit on the magnetic head was 46–60 μm

1: the width of the fouling deposit on the magnetic head was 61 μm or larger

Permalloy Corrosion:

A Permalloy film having the same composition as the MR head was formed by sputtering on a 100-μm base. The magnetic layer of each tape was brought into close contact with the Permalloy film, and the superposed tape and film were sandwiched between slide glasses having dimensions of 26 mm×76 mm. A 100-g weight was placed on the resulting assemblage, which in this state was stored in a 60° C., 90% RH atmosphere for 4 weeks. Thereafter, the degree of Permalloy corrosion was evaluated in five grades.

5: the area of the corroded Permalloy film surface was below ¼ of the area contacted with the tape 4: the area of the corroded Permalloy film surface was from ¼ to below ½ of the area contacted with the tape 3: the area of the corroded Permalloy film surface was from ½ to below ¾ of the area contacted with the tape 2: the area of the corroded Permalloy film surface was from ¾ to below 1/1 of the area contacted with the tape 1: the area of the corroded Permalloy film surface was almost the whole area contacted with the tape As is apparent from the results of Table 3, the samples of Examples 1 to 3 were improved in Permalloy corrosion, because the ferromagnetic metal particles were covered with a surface-treating agent and hence had a reduced catalytic effect on the hydrogen chloride-generating reaction of the vinyl chloride resin, and thereby the reaction was retarded. Head fouling caused by polyurethane hydrolysis was prevented, and these samples showed satisfactory electromagnetic characteristics.

In Example 4, since the amount of the surface-treating agent for the ferromagnetic metal particles was small, the ferromagnetic particles showed lower dispersibility than in Example 1. However, Table 3 shows that this amount of the surface-treating agent was sufficient for the inhibition of the hydrogen chloride-generating reaction.

In Example 5, although the amount of the surface-treating agent for the ferromagnetic metal particles was larger than in Example 1, this sample showed almost the same level of properties as the sample of Example 1. The sample of Example 5 had a slightly lower packing density of the ferromagnetic metal particles and a slightly lower $B_r$.

The sample of Example 6 was the same as in the sample of Example 1 except that a nonmagnetic layer was provided. The sample of Example 6 had a smooth surface roughness of the magnetic layer, and showed improved electromagnetic characteristics due to the reduced magnetic-layer thickness. Since the surface of the inorganic nonmagnetic particles had lower chemical activity than the surface of the ferromagnetic metal particles, the hydrogen chloride-generating reaction of the vinyl chloride resin was retarded even more, resulting in diminished Permalloy corrosion.

The samples of Examples 7 to 9 had a smooth magnetic-layer surface and improved electromagnetic characteristics, due to the improved particle dispersibility in the nonmagnetic layer because of the use of the inorganic nonmagnetic particles which also had been surface-treated.

The sample of Example 10 showed slightly reduced electromagnetic characteristics because it had an increased thickness loss due to the increased magnetic-layer thickness of 1 μm.

The sample of Comparative Example 1 showed insufficient electromagnetic characteristics because the $CrO_2$ was inferior in magnetic characteristics to ferromagnetic metal particles. A product of polyurethane hydrolysis deposited on the head.

The sample of Comparative Example 2 showed better electromagnetic characteristics than the sample of Comparative Example 1, but underwent polyurethane hydrolysis to cause head fouling.

The sample of Comparative Example 3 was improved in head fouling due to the use of a vinyl chloride resin, but the vinyl chloride resin underwent a hydrogen chloride-generating reaction to cause Permalloy corrosion.

The sample of Comparative Example 4 was reduced in the hydrogen chloride-generating reaction of the vinyl chloride resin, since the inorganic nonmagnetic particles had lower activity than ferromagnetic metal particles. Although Permalloy corrosion was thus improved slightly, no significant effect was observed because the ferromagnetic metal particles used had not been surface-treated.

According to the present invention, a magnetic recording medium can be provided in which magnetic recording with a thin-film magnetic head can be conducted at a high transfer rate and a high recording density, and which is effectively prevented from causing head fouling or Permalloy corrosion during or after long-term storage in a high-temperature high-humidity atmosphere and shows satisfactory electro-magnetic characteristics, by using ferromagnetic particles whose surface has been treated with at least an organic compound and selecting a vinyl chloride resin as a binder resin in the magnetic layer, and by forming the magnetic layer on a nonmagnetic layer at a thickness of from 0.05 to 1.0 μm and using a vinyl chloride resin as a binder resin in the nonmagnetic layer.

While the invention has been described in detail and with reference to specific embodiments thereof, it will be apparent to one skilled in the art that various changes and modifications can be made therein without departing from the spirit and scope thereof.

What is claimed is:

1. A magnetic recording system which comprises a combination of a thin-film magneto resistive head which is susceptible to corrosion due to hydrogen chloride and a magnetic recording medium comprising a nonmagnetic support having thereon a magnetic layer comprising mainly ferromagnetic particles and a binder resin, wherein said binder resin comprises 40 to 70% by weight vinyl chloride resin, 15 to 30% by weight polyurethane resin and 15 to 30% by weight polyisocyanate, said ferromagnetic particles are selected from the group consisting of ferromagnetic metal particles and ferromagnetic metal alloy particles and said ferromagnetic particles are surface-treated with at least one organic compound selected from the group consisting of an organic acid having a pka of 3 or less, an epoxy compound, a silane coupling agent, and a titanate coupling agent, and wherein the surface treatment of the ferromagnetic particles inhibits the generation of hydrogen chloride from the vinyl chloride resin to prevent the corrosion of the thin-film magneto resistive head.

2. The magnetic recording system as claimed in claim 1, wherein said organic compound is selected from the group consisting of an organic acid having a pKa of 3 or less, an epoxy compound and a silane coupling agent.

3. The magnetic recording system as claimed in claim 1, wherein said epoxy compound is selected from the group consisting of compounds represented by the following formulae:

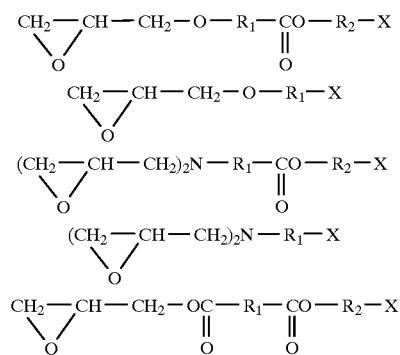

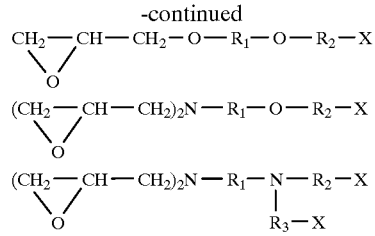

wherein $R^1$, $R^2$ and $R^3$ each represents an aliphatic or aromatic group and X represents —SO$_3$M, —OSO$_3$M, —OPO(OM)$_2$, —PO(OM)$_2$ or —COOM wherein M is a hydrogen atom or alkali metal.

4. The magnetic recording system as claimed in claim 1, wherein said silane coupling agent is selected from the group consisting of vinylethoxysilane, vinyltris(β-methoxyethoxy)silane, methacryloxypropyltrimethoxysilane, β-(3,4-epoxycyclohexyl)-ethylmethoxysilane, N-β(aminoethyl)-γ-aminopropyltrimethoxysilane, γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

5. The magnetic recording system as claimed in claim 1, wherein said titanate coupling agent is selected from the group consisting of isopropyl triisostearoyl titanate, isopropyl tri(N-aminoethylaminoethyl) titanate, tetraoctyl bis (ditridecyl phosphite) titanate, tetra(2,2-diallyloxymethyltributyl) bis(tridecyl) phosphite titanate, bis(dioctyl pyrophosphate) oxyanate titanate, bis(dioctyl pyrophosphate) ethylene titanate, isopropyl trioctanoyl titanate, isopropyl, dimethacryloyl isostearoyl titanate, isopropyl tridecyl benzenesulfonyl titanate, isopropyl stearoyl diacryloyl titanate, isopropyl tri(dioctylphosphate) titanate, isopropyl triamyl titanate, and tetraisopropyl bis(dioctyl phosphite) titanate.

6. The magnetic recording system as claimed in claim 1, wherein said organic compound is an organic acid having a pKa of 3 or less and is selected from the group consisting of α-naphthylphosphoric acid, phenylphosphoric acid, diphenylphosphoric acid, p-ethylbenzenephosphonic acid, phenylphosphonic acid, phenylphosphinic acid, methanesulfonic acid, benzenesulfonic acid, p-toluenesulfonic acid, naphthalene-α-sulfonic acid, and naphthalene-β-sulfonic acid.

7. The magnetic recording system as claimed in claim 1, wherein said ferromagnetic particles are selected from the group consisting of γ-FeO$_x$ (x=1.33–1.5), Co-modified γ-FeO$_x$ (x=1.33–1.5), particles of a ferromagnetic alloy containing Fe, Ni, or Co as the main component (75% or more), barium ferrite, and strontium ferrite.

8. The magnetic recording system as claimed in claim 7, wherein said ferromagnetic particles have a pH of from 7 to 10.

9. The magnetic recording system as claimed in claim 1, wherein said ferromagnetic particles are ferromagnetic alloy particles comprising Fe as a main component, Co in an amount of from 0 to 20% by weight and Ni in an amount of from 0 to 5% by weight; and have an acicular ratio of from 2 to 20.

10. The magnetic recording system as claimed in claim 9, wherein said ferromagnetic particles are ferromagnetic metal particles having a saturation magnetization of from 110 to 170 emu/g.

11. The magnetic recording system as claimed in claim 1, wherein said magnetic layer contains carbon black.

12. The magnetic recording system as claimed in claim 11, wherein said carbon black is contained in an amount of from 0.1 to 30% by weight based on the ferromagnetic particles, in the magnetic layer.

13. The magnetic recording system as claimed in claim 1, wherein said magnetic layer contains at least one abrasive agent selected from the group consisting of α-alumina having an α conversion of 90% or higher, β-alumina, silicon carbide, chromium oxide, cerium oxide, α-iron oxide, corundum, artificial diamond, silicon nitride, silicon carbide, titanium carbide, titanium oxide, silicon dioxide, and boron nitride.

14. The magnetic recording system as claimed in claim 13, wherein said abrasive agent has a particle size of from 0.01 to 2 μm.

15. The magnetic recording system as claimed in claim 1, wherein a nonmagnetic layer comprising nonmagnetic particles is provided between said magnetic layer and nonmagnetic support.

16. The magnetic recording system as claimed in claim 15, wherein said nonmagnetic particles are selected from the group consisting of titanium dioxide, zinc oxide, iron oxide and barium sulfate.

17. A magnetic recording system which comprises a combination of a thin-film magnetic head which is susceptible to corrosion due to hydrogen chloride and a magnetic recording medium comprising a nonmagnetic support, a nonmagnetic layer comprising mainly inorganic nonmagnetic particles and a binder resin over the nonmagnetic support, and a magnetic layer comprising mainly ferromagnetic particles and a binder resin over the nonmagnetic layer, wherein said binder resin in said magnetic and nonmagnetic layers each comprises 40 to 70% by weight vinyl chloride resin, 15 to 30% by weight polyurethane resin and 15 to 30% by weight polyisocyanate, said feromagnetic particles are selected from the group consisting of ferromagnetic metal particles and ferromagnetic metal alloy particles and said feromagnetic particles are surface-treated with at least one organic compound selected from the group consisting of an organic acid having a pka of 3 or less, an epoxy compound, a silane coupling agent and a titanate coupling agent, said magnetic layer has a thickness of from 0.05 to 1.0 μm and wherein the surface treatment of the ferromagnetic particles inhibits the generation of hydrogen chloride from the vinyl chloride resin to prevent the corrosion of the thin-film magneto resistive head.

18. The magnetic recording system as claimed in claim 17, wherein said inorganic nonmagnetic particles are surface-treated with at least an organic compound.

* * * * *